(12) United States Patent
Kurosaka et al.

(10) Patent No.: US 6,871,352 B2
(45) Date of Patent: Mar. 22, 2005

(54) DISK APPARATUS

(75) Inventors: Toshinori Kurosaka, Yamagata (JP); Atsushi Kirii, Yamagata (JP); Yoshimi Hanaika, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 240 days.

(21) Appl. No.: 10/118,913

(22) Filed: Apr. 10, 2002

(65) Prior Publication Data

US 2002/0150028 A1 Oct. 17, 2002

(30) Foreign Application Priority Data

Apr. 16, 2001 (JP) ........................................ 2001-116639

(51) Int. Cl.[7] .............................................. G11B 17/028
(52) U.S. Cl. ..................................... 720/707; 720/715
(58) Field of Search ................................. 720/703, 704, 720/706, 707, 709, 715–717; 369/270, 271

(56) References Cited

U.S. PATENT DOCUMENTS

| 4,562,570 A | 12/1985 | Denton ........................ 369/270 |
| 4,786,997 A | 11/1988 | Funabashi et al. ........... 369/270 |
| 5,323,379 A | 6/1994 | Kim ............................. 369/270 |
| 5,774,445 A * | 6/1998 | Sawi et al. .................. 720/707 |
| 5,956,315 A | 9/1999 | Sawai et al. ................ 369/270 |
| 6,041,033 A | 3/2000 | Otsubo et al. ............... 369/271 |
| 6,108,294 A | 8/2000 | Iwanaga ...................... 369/270 |
| 6,363,048 B1 | 3/2002 | Wu et al. .................... 369/271 |
| 6,556,376 B1 | 4/2003 | Boutaghou ............... 360/99.12 |
| 6,577,587 B1 | 6/2003 | Kishibe et al. ............. 369/270 |

FOREIGN PATENT DOCUMENTS

| JP | 9-282788 | 10/1997 |
| WO | WO 00/38185 | 6/2000 |

* cited by examiner

Primary Examiner—Brian E. Miller
(74) Attorney, Agent, or Firm—Whitham, Curtis & Christofferson, PC

(57) ABSTRACT

In a disk apparatus for driving a recording disk medium, a spindle motor is provided with a rotary shaft. A chucking table, on which the recording disk medium is mounted, includes a support integrally formed with a support base having a supporting face which supports the recording disk medium, a cylindrical bearing part, into which the rotary shaft is fitted, extending from the support base in parallel with the rotary shaft, and an annular abutment part extended from the support base in parallel with the bearing part, to be abutted against an inner periphery of the recording disk medium. The chucking table includes at least one claw member provided in an outer periphery of the abutment part, and an urging member disposed between the claw member and the bearing part so as to retractably urge the claw member outwards in a radial direction of the recording disk medium.

5 Claims, 4 Drawing Sheets

DISK APPARATUS

BACKGROUND OF THE INVENTION

The present invention relates to a disk apparatus for recording or reproducing information on/from a disk-like recording medium.

Hitherto, disk apparatuses for recording/reproducing information on/from disk-like recording media (hereunder referred to as recording disks), for example, CD-ROMs and CD-Rs have been widely used. The disk apparatus has a spindle motor for rotating and driving a recording disk, and a recording/reproducing head for recording/reproducing information by irradiating laser light or applying an external magnetic field to an information recording face of a disk-like recording medium. Further, the disk apparatus is constructed so that a recording disk is freely attachable to and detachable from a chucking table attached to the rotary shaft of the spindle motor.

Hitherto, such disk apparatuses have been mounted on various kinds of computer systems, and utilized as external storage devices. However, in the case that such a disk apparatus is mounted on a small apparatus, such as a notebook computer having been coming into wide use in recent years, more miniaturization and thickness reduction are demanded of the disk apparatus.

Meanwhile, the chucking table of a related disk apparatus has a structure as illustrated in, for example, FIG. 6.

That is, a chucking table 100 comprises a support 102, which is formed like a disk, for supporting the bottom face of a recording disk 101, and a cover 103 coaxially integrated with the support 102. The cover 103 is formed with a bearing part 103a to be fitted with this rotary shaft 104a, and an abutment part 103b that abuts against an inner periphery 101a of the recording disk 101. Further, the support 102 and the cover 103, which are in an integrated state, are fixed to the rotary shaft 104a of the spindle motor 104 such that the bearing part 103a extends along the rotary shaft 104a.

Further, the chucking table 100 has a claw portion 105 projected from the abutment part 103b. This claw portion 105 outwardly pushes the inner periphery 101a of the recording disk 101 in the radial direction thereof by a spring member 106 disposed between this claw portion 105 and the bearing part 103a to thereby retain the recording disk 101 on the chucking table 100.

However, the chucking table 100 of such a structure needs to reduce the thickness of the support 102 indicated by an arrow A in FIG. 6 for the purpose of reducing the thickness so that the distance between the recording disk 101 and the spindle motor 104 is narrow. In such a configuration, it is extremely difficult to attach the support 102, which is formed in such a way as to be thin, to the rotary shaft 104a in such a manner as to be perpendicular thereto. Therefore, the assembling accuracy of the disk apparatus is degraded. It is difficult to enhance the production efficiency. Moreover, when the support 102 (thus, the chucking table 100) is obliquely attached to the rotary shaft 104a, axial runout occurs in the recording disk. Thus, it is impossible to perform normal recording/reproducing operations.

Thus, it is considered that a bearing part 102a is provided in range with and formed along a part extending from the support 102 to the rotary shaft 104a, as shown in, for example, FIG. 7, to thereby enhance the accuracy in attaching the support 102 to the rotary shaft 104a. However, in this case, since the cover 103 abutting against the recording disk 101 is attached to the rotary shaft 104a through the bearing part 102a of the support 102, the assembling accuracy of the cover 103 with respect to the rotary shaft 104a tends to be degraded. Accordingly, the recording disk 101 is not accurately mounted on the chucking table 100 coaxially with the rotary shaft 104a, and that it is, thus, difficult to perform a normal recording/reproducing operation.

SUMMARY OF THE INVENTION

It is therefore an object of the invention is to provide a disk apparatus enabled to reduce the thickness thereof by improving the structure of a chucking table and to thereby perform a reliable recording/reproducing operation.

In order to achieve the above object, according to the present invention, there is provided a disk apparatus for driving a recording disk medium, comprising:

a spindle motor, provided with a rotary shaft; and a chucking table, on which the recording disk medium is mounted, the chucking table including:

a support, integrally formed with:

a support base, having a supporting face which supports the recording disk medium;

a cylindrical bearing part, into which the rotary shaft is fitted, the bearing part extending from the support base in parallel with the rotary shaft; and an annular abutment part, extended from the support base in parallel with the bearing part, the abutment part being abutted against an inner periphery of the recording disk medium;

at least one claw member, provided in an outer periphery of the abutment part; and an urging member, disposed between the claw member and the bearing part so as to retractably urge the claw member outwards in a radial direction of the recording disk medium.

In the disk apparatus, since both the bearing part and the abutment part of the chucking table are integrally provided the support, and the urging member for urging the claw member is interposed between the claw portion and the bearing part, it is easy to accurately attach the support to the rotary shaft of the spindle motor. Moreover, it is easy to attain dimensional accuracy of the abutment part. Consequently, the recording disk medium can be accurately mounted on the chucking table so as to be coaxial with the rotary shaft of the spindle motor.

Therefore, the axial runout and eccentricity of the recording disk medium are prevented so that normal recording/reproducing operations can reliably be performed. Moreover, the thickness of a chucking table is reduced so that the reduction in the thickness of the entire apparatus can be realized.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
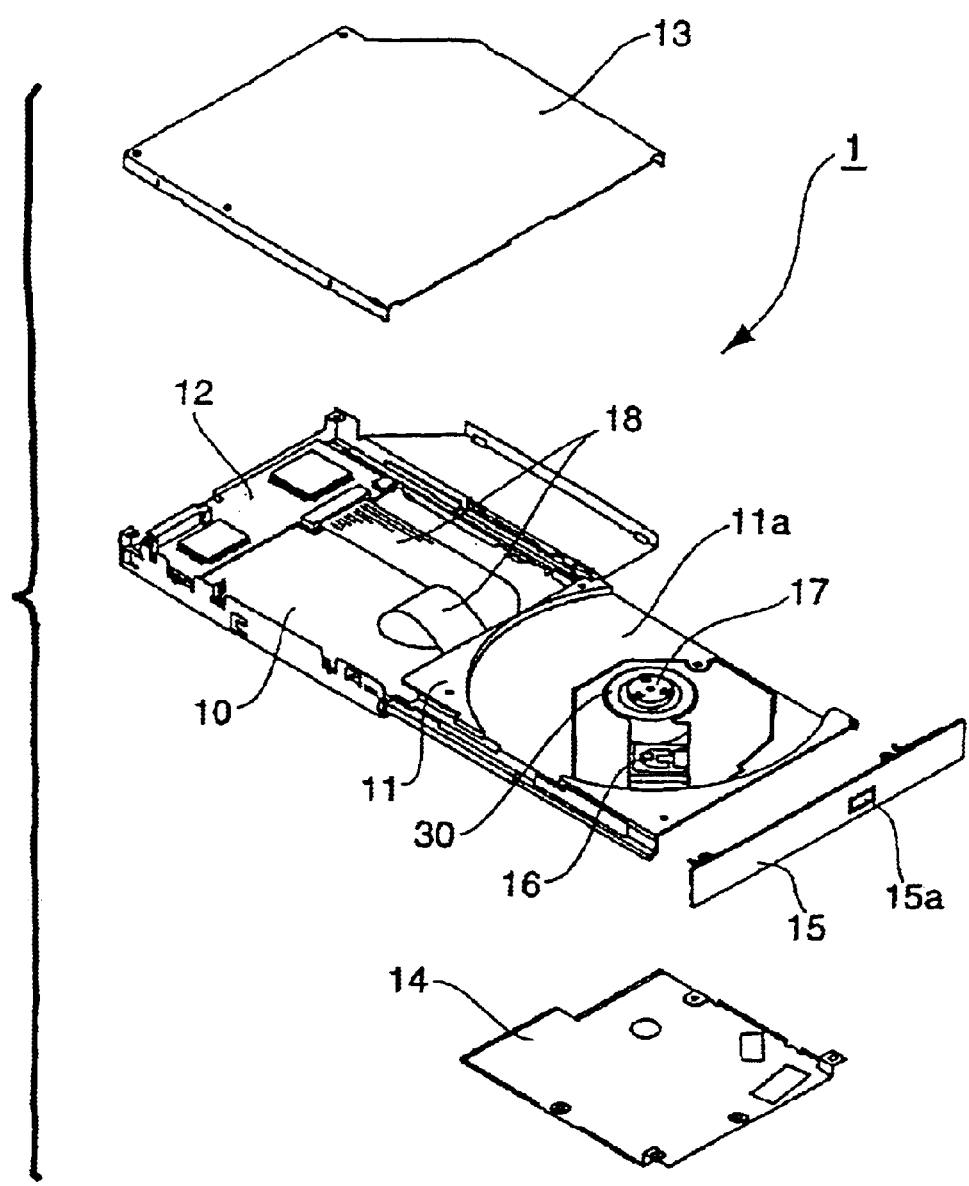
FIG. 1 is an exploded perspective view of a disk apparatus according to an embodiment of the invention.

Hereinafter, a preferred embodiment of the invention is described in detail with reference to the accompanying drawings. Hereunder, an optical disk apparatus 1 illustrated in FIG. 1 is described as an apparatus, to which the invention is applied. In the optical disk apparatus 1, an optical disk, for example, CD-ROM or CD-R is used in such a manner as to be detachably attached thereto. The optical disk apparatus 1 performs recording/reproduction of information on/from this optical disk.

As shown in FIG. 1, in an optical disk 1, a disk tray 11, on which an optical disk is mounted, and a circuit board 12 constituted by a semiconductor circuit for performing arithmetic processing required to perform various kinds of signal processing are disposed on a chassis 10 formed from a metallic material. Further, a top plate 13 and a bottom plate 14, which are formed like a plate from a metallic material, are mounted on the top face side and the lower face side of the chassis 10, respectively.

The disk tray 11 has rails provided on both side parts thereof. The rails are freely drawn out from the chassis 10 in frontward and backward directions. Furthermore, a front panel 15 having an eject button 15a is attached to the front face of the disk tray 11.

Further, the disk tray 11 has a concave portion 11a, which corresponds to the shape of this optical disk, on a face on which an optical disk is placed. An optical disk is put on the concave portion 11a during a state in which the disk tray 11 is drawn out of the chassis 10. Moreover, the disk tray 11 is accommodated in the chassis 10 together with the optical disk put on the concave portion 11a.

Further, the disk tray 11 has a spindle motor (not shown in FIG. 1) for rotating and driving an optical disk, and also has an optical head 16 for performing a recording/reproducing operation with respect to the optical disk.

A chucking table 17 is attached to a rotary shaft 61 of the spindle motor 60. The chucking of an optical disk is performed by way of this chucking table 17.

The optical head 16 is enabled to freely move in a radial direction of the optical disk. Laser light is irradiated onto an information recording face of the optical disk. Reproduction of information is performed by detecting light reflected from the information recording face.

Further, a spindle motor 60 and an optical head 16 are connected to a circuit board 12 by an FPC (Flexible Printed Circuit) 18, and operates according to a signal outputted from the circuit board 12.

Figure 2:
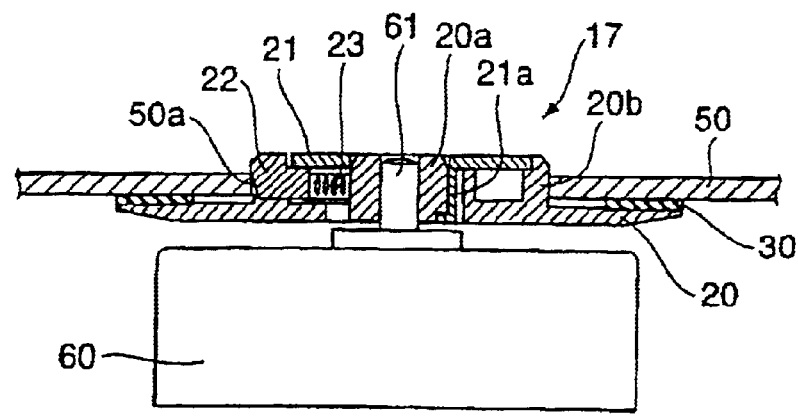
FIG. 2 is a section view illustrating the structure of a chucking table according to the embodiment.

Incidentally, the chucking table 17 has a structure as illustrated in FIG. 2 so as to reduce the thickness of the disk apparatus 1. That is, the chucking table 17 has a support 20, which is formed nearly like a disk, for supporting the bottom face of an optical disk 50, and also has a cover 21 for covering the top face side of this support 20. The support 20 and the cover 21 are integrally connected with each other by an engaging piece 21a extended from the cover 21.

The support 20 is formed with a bearing part 20a so as to extend along the rotary shaft 61 of the spindle motor 60 when the rotary shaft 61 is fitted therein. On the other hand, the support is formed with an abutment part 20b so as to be abutted against the inner periphery 50a of the recording disk 50. Further, the chucking table 17 has a claw portion 22 protruded from the abutment part 20b.

The claw portion 22 is urged outwards by an urging member 23, such as a coiled spring or an elastic piece, provided between the bearing part 20a and the claw portion 22, so that the claw portion 22 abuts against the inner periphery 50a of the recording disk 50 to retain the recording disk 50 on the chucking table 17. Incidentally, although it is sufficient to provided at least one claw portion 22 is disposed on the chucking table 17, it is preferable that three claw portions 22 are provided thereon. Consequently, the recording disk 50 can be sufficiently pushed by a minimum configuration in all directions to perform the chucking reliably.

As described the above, the chucking table 17 is constructed so that both the bearing part 20a and the abutment part 20b are continued from the support 20, so that both of the rotary shaft 61 and the inner periphery 50a of the recording disk 50 are retained one-piece member.

According to this configuration, the length of the rotary shaft 61 press-fitted with this support 20 can be set to be longer. Consequently, the support 20 can be attached to the rotary shaft 61 with sufficient accuracy by performing a simple assembling operation of inserting the rotary shaft 61 into the bearing part 20a. Further, the recording disk 50 can be accurately mounted on the chucking table 17 coaxially with the rotary shaft 61 of the spindle motor 60.

Incidentally, it is desirable to provide a slip preventing sheet on the top face of the support 20 to prevent the recoding disk 50 from slipping on the chucking table 17 by abutting a reverse face of the recording disk 50. For example, a member formed like a sheet from a material, such as synthetic rubber, having a relatively high face friction coefficient may be used as the slip preventing sheet 30.

Figure 3:
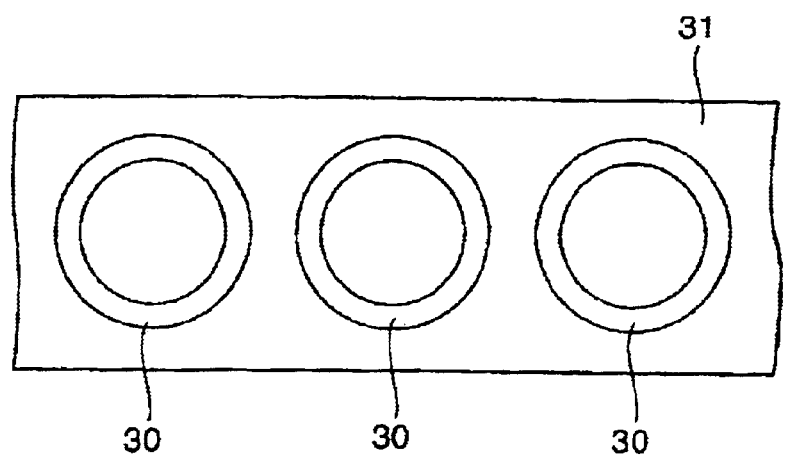
FIG. 3 is a plan view illustrating a first example of a slip preventing sheet placed on the chucking table according to the embodiment.
Figure 4:
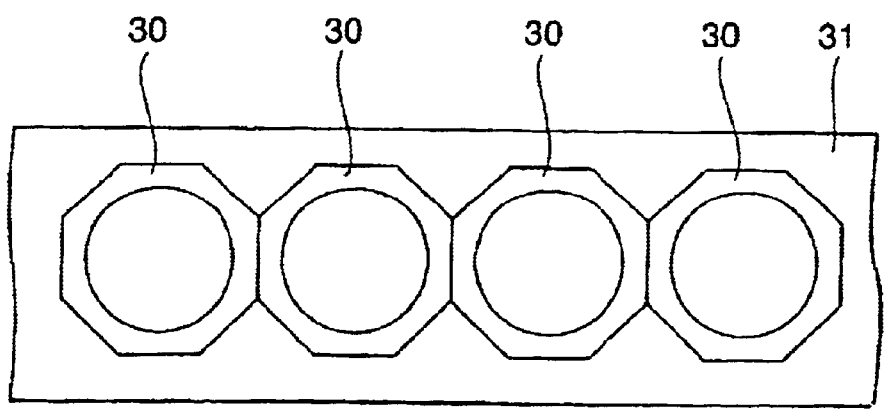
FIG. 4 is a plan view illustrating a second example of a slip preventing sheet placed on the chucking table according to the embodiment.

As illustrated in FIG. 1, this slip preventing sheet 30 may be formed like a ring corresponding to the shape of the chucking table 17. In this case, as illustrated in FIG. 3, when this slip preventing sheet is cut out of a rubber sheet 31, a large part of the rubber sheet becomes unnecessary. Thus, as illustrated in FIG. 4, such waste can be eliminated by forming the slip preventing sheet 30 like a polygon (in the case shown in FIG. 4, an octagon) when the slip preventing sheet is cut out of a rubber sheet. Therefore, the number of slip preventing sheets 30, which can be cut out of one rubber sheet, is increased. Consequently, the productivity of the disk apparatus can be enhanced by reducing the material cost thereof.

Figure 5:
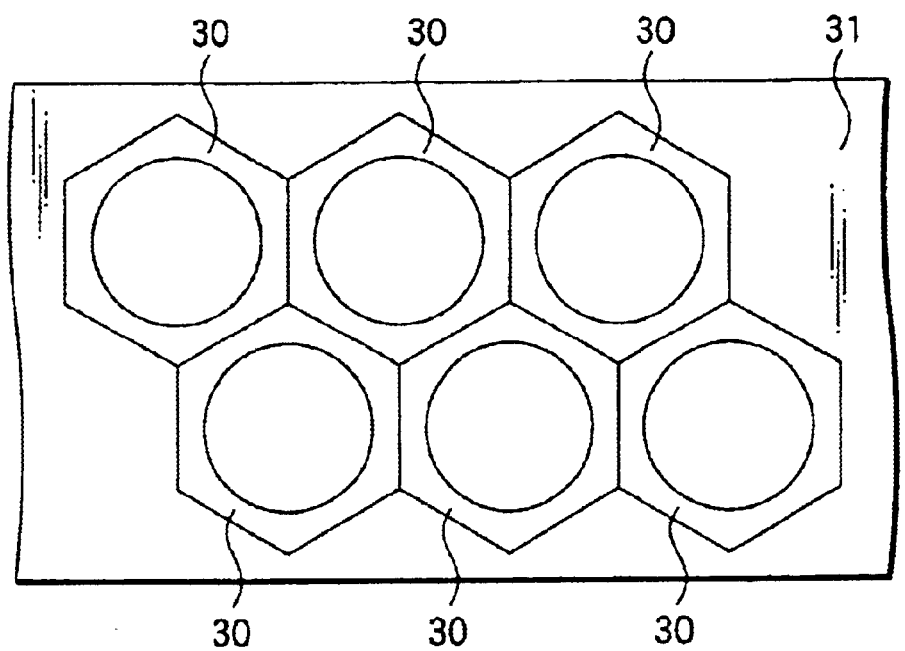
FIG. 5 is a plan view illustrating a third example of a slip preventing sheet placed on the chucking table according to the embodiment.
Figure 6:
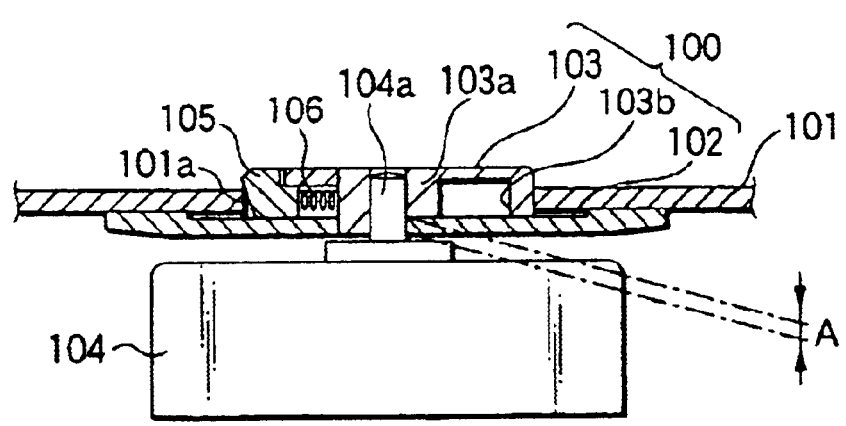
FIG. 6 is a section view illustrating the structure of a first related chucking table.
Figure 7:
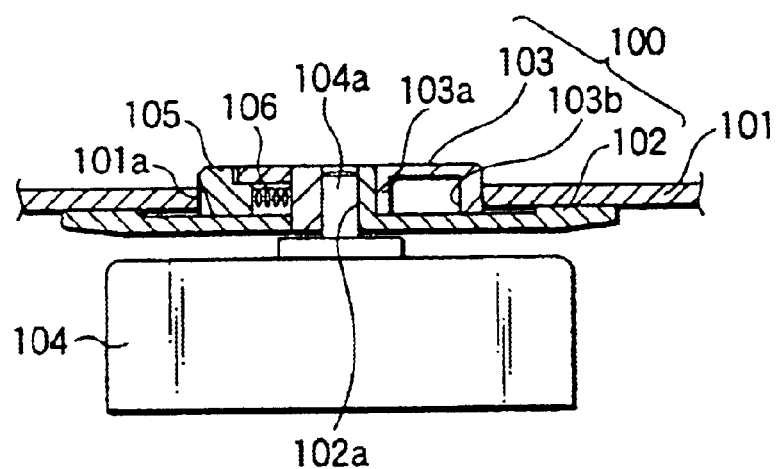
FIG. 7 is a section view illustrating the structure of a second related chucking table.

Incidentally, the shape of the slip preventing sheet 30 is not limited to a specific polygon. However, when the slip preventing sheet 30 is shaped into a hexagon, as shown in FIG. 5, the slip preventing sheets 30 can be cut out of the rubber sheet 31 continuously not only in a transversal direction but in a longitudinal direction. This method can most effectively eliminate the waste.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A disk apparatus for driving a recording disk medium, comprising:

a spindle motor, provided with a rotary shaft; and a chucking table, on which the recording disk medium is mounted, the chucking table including:
- a support, integrally formed with:
  - a support base, having a supporting face which supports the recording disk medium;
  - a cylindrical bearing part, into which the rotary shaft is fitted, the bearing part extending from the support base in parallel with the rotary shaft;
  - a cover having an engaging piece engaged with the cylindrical bearing part; and
  - an annular abutment part, extended from the support base in parallel with the bearing part, the abutment part being abutted against an inner periphery of the recording disk medium;
- at least one claw member, provided in an outer periphery of the abutment part; and
- an urging member, disposed between the claw member and the bearing part so as to urge the claw member outwards in a radial direction of the recording disk medium.

2. The disk apparatus as set forth in claim 1, wherein the chucking table includes a slip preventing sheet disposed on the supporting face.

3. The disk apparatus as set forth in claim 2, wherein the slip preventing sheet is shaped into a ring.

4. The disk apparatus as set forth in claim 2, wherein an outer periphery of the slip preventing sheet is shaped into a polygon.

5. The disk apparatus as set forth in claim 4, wherein the outer periphery of the slip preventing sheet is shaped into an equilateral hexagon.

* * * * *